United States Patent [19]

Wilson

[11] 4,367,140

[45] Jan. 4, 1983

[54] REVERSE OSMOSIS LIQUID PURIFICATION APPARATUS

[75] Inventor: Leslie P. S. Wilson, Nassau, The Bahamas

[73] Assignee: Sykes Ocean Water Ltd., Turks and Caicos Isls.

[21] Appl. No.: 202,197

[22] Filed: Oct. 30, 1980

[30] Foreign Application Priority Data

Nov. 5, 1979 [GB] United Kingdom ............... 7938244

[51] Int. Cl.³ ............................................ B01D 31/00
[52] U.S. Cl. .................................... 210/110; 210/116;
210/117; 210/134; 210/136; 210/137;
210/257.2; 210/433.2; 137/99; 137/544;
137/599; 137/625.34
[58] Field of Search .................... 210/96.2, 101, 103,
210/110, 116, 117, 134, 136, 137, 257.2, 321,
416.1, 433.2; 417/251–253, 313, 394, 395, 404,
555 R; 137/99, 101.21, 106, 512.1, 544, 560,
625.34, 625.35, 625.69, 599

[56] References Cited

U.S. PATENT DOCUMENTS 4,054,522 10/1977 Pinkerton ..................... 137/99 X
4,178,240 12/1979 Pinkerton ..................... 417/395 X

FOREIGN PATENT DOCUMENTS 832648 12/1975 Belgium ...................... 210/321.3
7701451 5/1977 Netherlands ............... 210/321.3

*Primary Examiner*—Charles N. Hart
*Assistant Examiner*—David R. Sadowski
*Attorney, Agent, or Firm*—Mawhinney & Mawhinney & Connors

[57] ABSTRACT

In apparatus for the reverse osmosis purification of water or other fluid in a module containing a membrane, the water is forced into the module under pressure using two piston-cylinder assemblies mechanically interconnected with the pressurized fluid from the module applied to the rear face of the piston which, from its front face, is driving water into the module, a low pressure continuously operating pump providing a low pressure on the other piston to supply the necessary extra pressure. Valve means automatically reverse the functions of the two cylinders at each end of each stroke.

9 Claims, 8 Drawing Figures

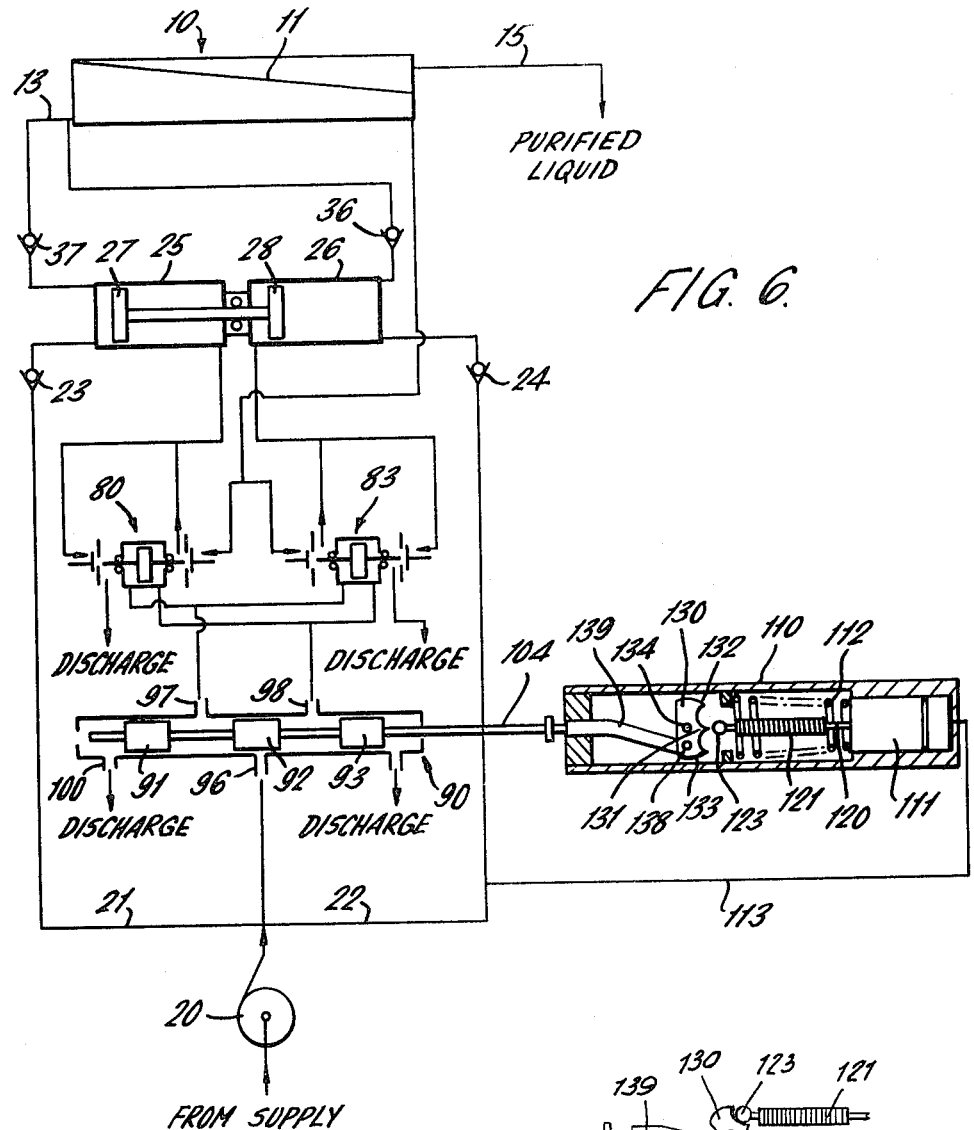
FIG. 6.
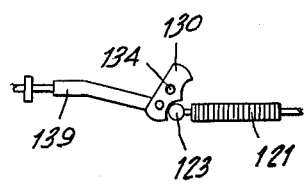
FIG. 6A.
FIG. 6B.

REVERSE OSMOSIS LIQUID PURIFICATION APPARATUS

BACKGROUND OF THE INVENTION

1. Field of the Invention

This invention relates to apparatus for the purification of a liquid, such as water, by reverse osmosis.

2. Prior Art

In the specification of U.S. Pat. No. 4,124,488 there is described an apparatus for the reverse osmosis purification of water or other fluid comprising a module including a reverse osmotic membrane, a fluid inlet and fluid outlet for passage of fluid through the module over one surface of the membrane and an outlet for the passage of purified fluid out of the module from the opposite surface of the membrane, together with a ram having a piston or diaphragm in a cylinder for forcing fluid from the front face of the piston or diaphragm through a valve to the fluid inlet of the module, the ram having an operating rod extending outwardly from the rear face of the piston or diaphragm and means, including a first controlled valve connecting said fluid outlet from the module to the cylinder to admit returned fluid from the module onto the rear face of the piston or diaphragm and a second control valve to control discharge from the rear of the piston or diaphragm. Such apparatus will be referred to hereinafter as apparatus of the kind described.

With this construction, a fluid such as seawater is forced by the ram into the module. A valve is provided between the ram and the module to prevent return of fluid from the module on the return stroke of the ram; this may be a non-return valve or it may be a valve which is controlled by the fluid pressure or by the movement of the ram or in synchronism therewith. On the forward stroke of the ram, some water may pass through the membrane and the remainder of the fluid is returned to the rear face of the piston or diaphragm.

As is explained in the aforementioned specification, with this arrangement, fluid may be forced into the module at a very high pressure such that water purification can be obtained. For brackish water, a pressure of the order of 300 to 500 p.s.i. would be necessary whilst for seawater, since the osmotic pressure is higher, a pressure typically of the order of 600 to 1000 p.s.i. might be necessary. The construction described above enables these high pressures to be obtained economically and efficiently because the return fluid from the membrane is applied to the rear surface of the piston or diaphragm. This rear surface, because of the presence of the operating rod, has a slightly smaller effective area. The pressure in the system builds up until a pressure is reached at which water will pass through the membrane on each stroke in equivalent volume to the difference in volume between the rear and front ends of the cylinder due to the presence of the operating rod. Power has to be supplied to the operating rod and the required work for each stroke depends only on the difference of the front and rear face areas, the pressure and the length of the stroke. The device is thus self-regulating and tends to operate in a condition where the proportion of water passing through the membrane to the total inlet fluid is equal to the ratio of the operating rod cross-section to the piston or diaphragm front face area. There is thus no need for any pressure regulation by relief valves. No adjustment is required for variations of salinity and the same equipment may be used for seawater as for slightly brackish water. Although it is convenient to refer to water, the apparatus may be used for reverse osmosis treatment of other fluids.

Reference may also be made to the following further U.S. Pat. Nos. 1,909,145; 3,405,058; 3,493,495; 3,498,910; 3,825,122.

BRIEF SUMMARY OF THE INVENTION

It is one of the objects of the present invention to provide a reverse osmosis liquid purification apparatus of the kind described above in which the necessity for a mechanical reciprocating drive system is avoided.

According to this invention, apparatus for the reverse osmosis purification of water or other fluid comprises a module including a reverse osmotic membrane, a fluid inlet and fluid outlet for passage of fluid over one surface of the membrane and an outlet for the passage of purified fluid out of the module from the opposite surface of the membrane together with a plurality of similar cylinders each having a piston or diaphragm and each arranged for forcing fluid from the front face of the piston or diaphragm through a separate valve to the fluid inlet of the module, the pistons or diaphragms being mechanically interconnected by operating rods extending from their rear faces to operate in a cyclic sequence, means arranged for supplying fluid under pressure from a fluid supply to the front end of each cylinder through a separate non-return valve, and controlled valve means operative selectively to connect the rear end of each cylinder alternately to the fluid outlet of the module and to a discharge in synchronism with said cyclic sequence.

In this construction, the pump means supply the fluid to be treated to the front ends of the various cylinders for subsequent forcing at high pressure into the module. This fluid from the pump means provides the necessary driving power for operating the pistons or diaphragms in the various cylinders. There is thus no need for any gearbox or mechanical drive to the pistons or diaphragms. If there are three or more cylinders, the pistons or diaphragms may have their operating rods interconnected by a crank-shaft; this crank-shaft however is free-running, the drive power coming from the pump.

In the simplest case however only two cylinders are employed and, in this case, the pistons or diaphragms may be directly connected by an operating rod.

In a preferred embodiment of the invention apparatus for the reverse osmosis purification of water or other fluid comprises a module including a reverse osmotic membrane, a fluid inlet and fluid outlet for passage of fluid over one surface of the membrane and an outlet for the passage of purified fluid out of the module from the opposite surface of the membrane together with ram means comprising a pair of similar cylinders each having a piston or diaphragm and each arranged for forcing fluid from the front face of the piston or diaphragm through a separate valve to the fluid inlet of the module, the cylinders being aligned with a common operating rod extending from the rear face of one piston or diaphragm to the rear face of the other piston or diaphragm, pump means arranged for supplying fluid under pressure from a fluid supply through separate non-return valves to the front end of each ram and controlled valve means operative selectively to connect the fluid outlet from the module to the rear end of one ram and to connect the rear end of the other ram to a discharge or vice-versa, with control means for said valve means operative to change-over the connections when the pistons or diaphragms are at or near the end of a stroke. The aforesaid separate valves through which fluid is forced from the front face of the piston or diaphragm to the module are conveniently non-return valves but they could be further valves controlled by said control means.

With this apparatus, the pump means can be a continuously running pump, conveniently an impeller or gear or vane pump. The outlet from this pump need only be at a very low pressure compared with the pressure required in the module and might typically be 80 p.s.i. This output is applied through non-return valves to the front ends of both rams (considering a system with only two cylinders). One of these rams has its rear end connected to discharge. The other ram has its rear end connected to the high pressure outlet from the module. The two rams are interconnected by the common operating rod. Considering the ram with its rear end connected to discharge, the piston or diaphragm will tend to move towards the rear end. The pump pressure, applied over the whole front face, will exert a force on the operating rod, which force is applied to the other piston or diaphragm and is additive with the return fluid pressure from the module on the rear face of that piston or diaphragm. Movement of the two pistons or diaphragms thus takes place if the required module pressure is developed on the front face of the second piston or diaphragm, i.e. if the force in the operating rod is sufficient to overcome the effect of the different areas of the front and rear faces which are both subject to the module pressure. It will thus be seen that the required pump pressure is a fraction of the required module pressure determined by the ratio of the cross-sectional areas of the operating rod and of the piston.

As described in the aforementioned U.S. Specification No. 4,124,488, the apparatus will inherently operate at a module pressure such that the extraction ratio is equal to the ratio of the cross-sectional areas of the operating rod and piston. If the extraction ratio is less than this, then the volume of return fluid fed to the rear face of a piston will be greater than can be accommodated by movement of the piston to force the appropriate volume of fluid into the module. The pressure inherently builds up to give the required extraction ratio. In the apparatus of the present invention, no movement of the pistons will occur until the pump pressure has built up to the necessary pressure to provide the required operating force. Although the pump is connected to the front ends of both cylinders, the non-return valve will be closed between the pump and that one of the cylinders which is supplying pressure fluid to the module. The other non-return valve will be open but fluid will only flow from the pump to the cylinder when the required pressure has developed. It is thus possible to use any pump means which will develop the required fluid pressure, which, as previously indicated, would typically be about 80 p.s.i. Flow will commence when the required pressure is reached. It will be seen that the pressures throughout the system are self-regulating; both the extraction ratio and the ratio of pump to module pressure are predetermined by choice of the ratio of operating rod cross-section to piston area.

The controlled valves have to change-over at or near the end of each stroke. These valves might be electrically operated or mechanically operated or hydraulically operated. Very conveniently hydraulic operation is employed, making use of the rise in pressure in the output from the pump at the end of a stroke (when flow must cease). As soon as the valves change-over, the pressure will fall and thus there is a pressure-pulse at each end of each stroke. Conveniently a reversing actuator, e.g. a semi-rotary flow reversing device, is provided which, on one pulse, sets the valves in one position and, on the next pulse, reverses the valve positions. To avoid the pressure pulses, other means may be employed for detecting the end of a stroke, e.g. inductive sensing means for detecting the position of the piston; such means would conveniently be employed to control electrically operated valves.

The controlled valves may be spool or piston valves. They have to control fluid which may be at the module pressure. To operate such valves from the pump outlet fluid, it may be preferred to use pressure intensifying means.

In a particularly convenient arrangement, the controlled valves are operated hydraulically by a spool valve and the rise in pressure at the end of each operating stroke of the main pistons is utilized to effect reversal of the spool valve.

The two main cylinders may be mounted back-to-back. There would be no need for any bearings for the operating rod between the cylinders and only one seal, on this operating rod, would be necessary. There is no need for any tight seal between the pistons and cylinders because the pressures on the two sides of each piston are nearly equal if the cylinder is subject to module pressure.

BRIEF DESCRIPTION OF THE DRAWINGS

FIGS. 5 and 6 are diagrams illustrating two further forms of reverse osmosis liquid purification apparatus; and FIGS. 6a and 6b are diagrams illustrating part of the apparatus of FIG. 6 in different positions during a cycle of operation.

DESCRIPTION OF THE PREFERRED EMBODIMENTS

Figure 1:
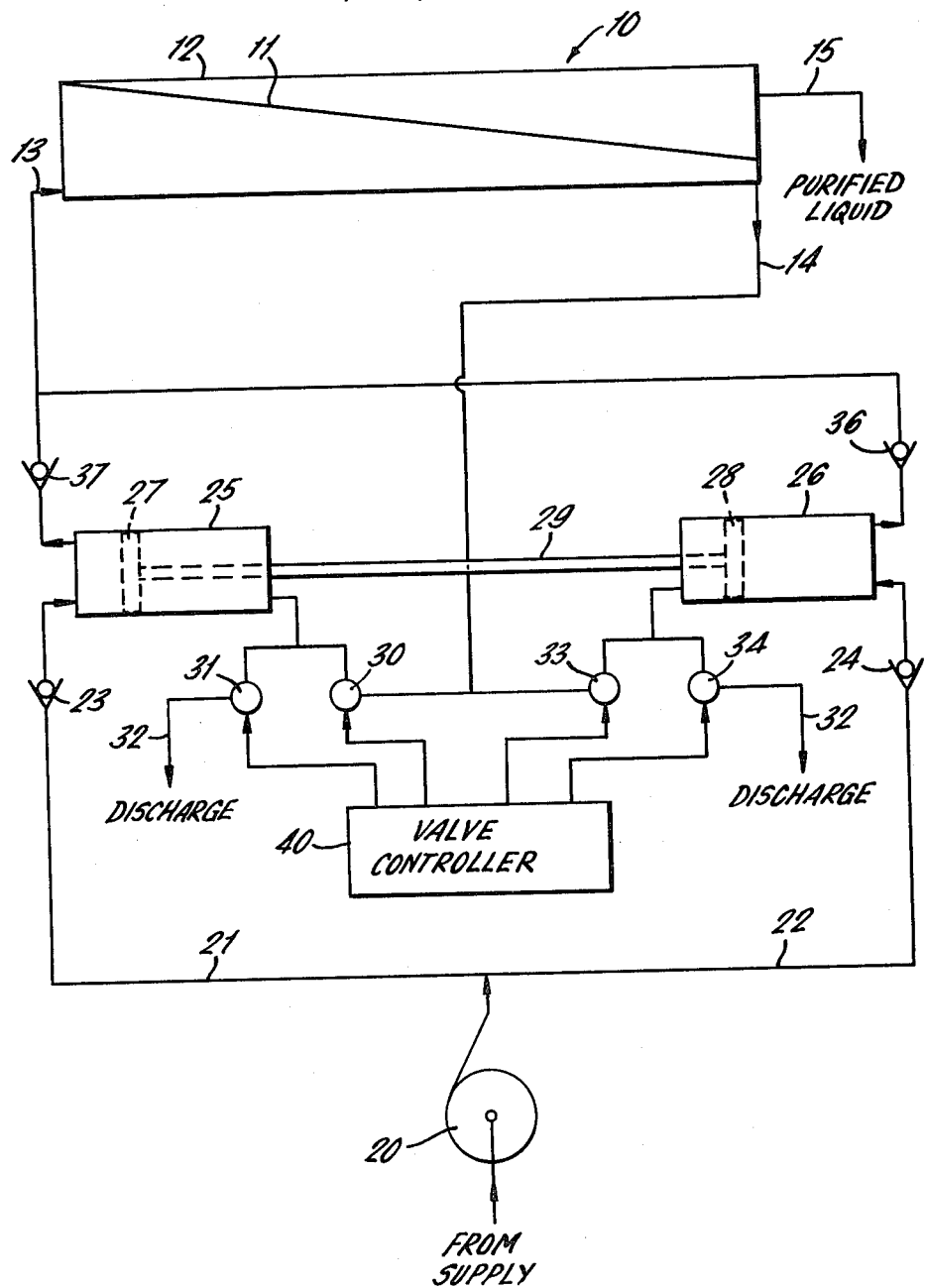
FIG. 1 is a diagram illustrating one form of reverse osmosis liquid purification apparatus.

Referring to FIG. 1, there is shown diagrammatically at 10 a reverse osmosis liquid purification module having a membrane 11 in a housing 12 with a fluid inlet 13 and fluid outlet 14 on one side of the membrane and a purified liquid outlet 15 on the other side of the membrane. This module may be constructed in the known manner, for example having a sheet of cellulose acetate or polyamide membrane material wound spirally with a liquid-conducting backing sheet around a perforated tube which receives the purified liquid. As another example, the known hollow fibre construction may be employed.

A rotary pump 20, e.g. an impeller pump or gear pump or vane pump driven by an electric motor feeds liquid to be purified at a pressure typically of 80 p.s.i. to ducts 21, 22 leading respectively via non-return valves 23, 24 to the front ends of two cylinders 25, 26 having pistons 27, 28 respectively. In some cases the fluid may be available under a suitable pressure without a pump, e.g. a water supply from a dam. These cylinders 25, 26 are aligned and the pistons are joined by a rigid connecting rod 29 extending between the rear faces of the two pistons. By means of valves 30, 31, the rear end of cylinder 25 is connected selectively either to the module outlet 14 or to a discharge 32. By means of valves 33, 34, the rear end of cylinder 26 is connected selectively either to the module outlet 14 or to the discharge 32. The valves 30, 31, 33 and 34 are controlled in synchronism with the operation of the pistons so that they change-over at or near each end of each stroke.

When fluid from pump 20 is entering the front end of cylinder 25, the rear end of that cylinder is connected to discharge 32 and thus the pump pressure on the piston applies a force to the connecting rod 29. This force, as previously explained, supplements the force on the rear face of piston 28 due to the module fluid pressure and, provided the pump pressure is sufficient, will cause fluid to be forced from the front end of cylinder 26 through a non-return valve 36 into the module inlet 13. A further non-return valve 37, between the module inlet and the front end of cylinder 25 prevents the pressurised fluid in the module from entering the front end of cylinder 25.

At the end of the stroke, the valves 30, 31, 33 and 34 are changed over by control means 40. These control means may be electrical, e.g. microswitches controlling solenoids operating the valves, or mechanical or hydraulic.

As previously explained, the apparatus will develop a pressure in the module such as will give an extraction ratio corresponding to the ratio of the operating rod section to the piston area. This ratio will also determine the pressure which will have to be developed by pump 20 to effect measurement of the pistons. The apparatus is self-regulating in this respect, inherently developing the required pressures.

Figure 2:
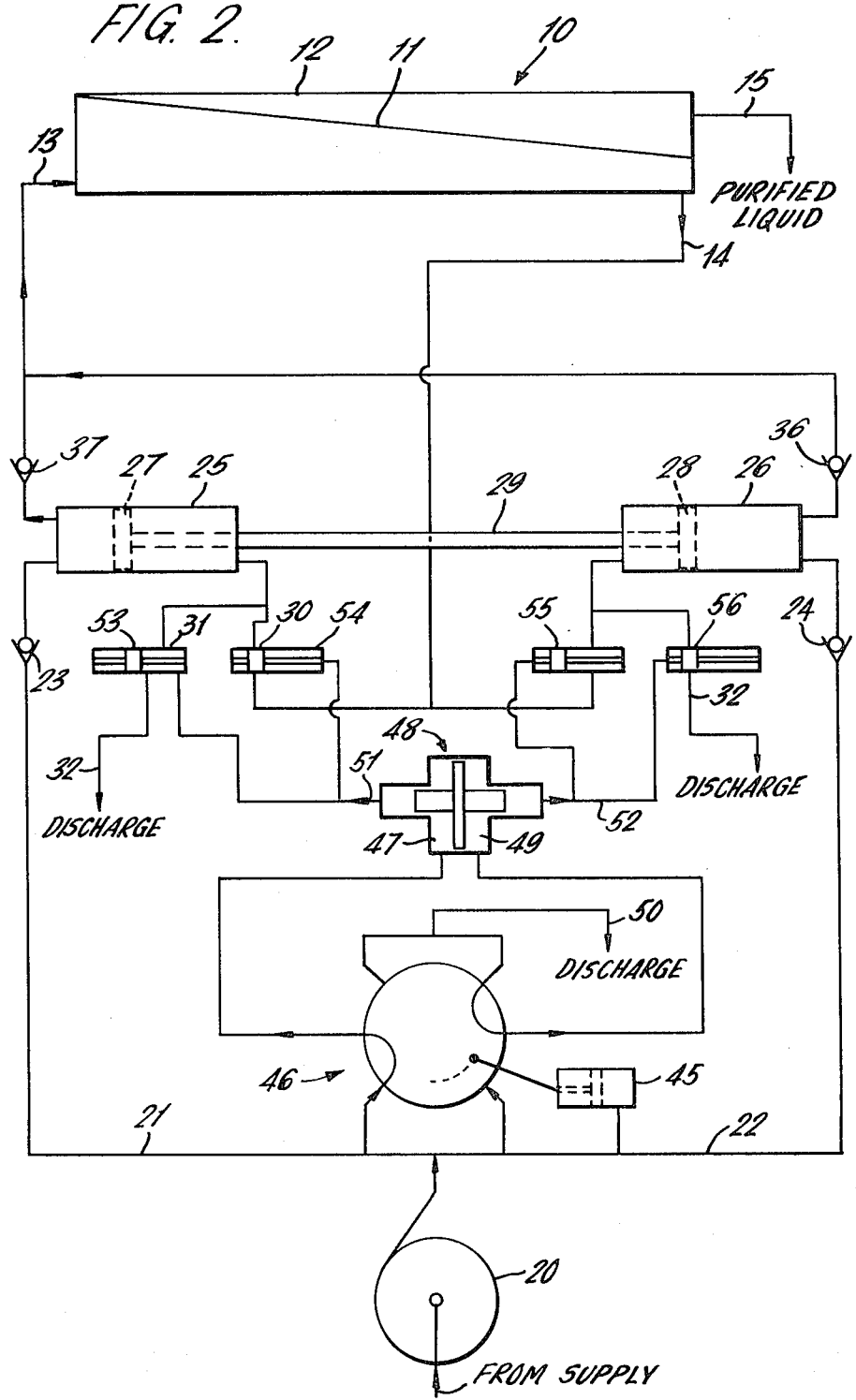
FIG. 2 is a diagram showing in further detail another construction of the apparatus.

Many types of valve control means may be used for controlling the valves 30, 31, 33 and 34. FIG. 2 illustrates a hydraulically operated system. In FIG. 2 there is shown a reverse osmosis system in many ways similar to that of FIG. 1 and the same reference characters are used to indicate corresponding elements. In the following description mention will be made only of the distinctive features of the construction of FIG. 2. In this arrangement use is made of the pressure pulse which occurs in the output from the pump 20 at the end of each stroke. When the pistons stop moving, the pressure will rise but, since the valves are then immediately actuated in a manner to be described later, the pressure falls again and thus there is in effect a pressure pulse at each end of each stroke. This pressure pulse is applied to a pulse actuator 45 and has a spring-loaded piston set so that it will jump open at a predetermined pressure. This pulse actuator operates a semi-rotary reversing switch 46 which switch, in one position connects the output of the pump 20 to one side 47 of a pressure intensifier 48 and, in the other position, connects the output of the pump to the other side 49 of the pressure intensifier. The side of the pressure intensifier to which the pump pressure is not employed is connected by the reversing switch to a discharge 50. The intensifier provides output at typically 1000 p.s.i. on one or other of two lines 51, 52 according to the setting of the reversing switch. The output on line 51 controls spool or piston valves 53, 54 for the rear end of cylinder 25 whilst the output on line 52 controls spool or piston valves 55, 56 for the rear end of cylinder 26. These valves are operated as previously described so that the rear end of each cylinder is connected either to the module outlet or to the discharge 32 according to the required direction of movement of the pistons.

Figure 3:
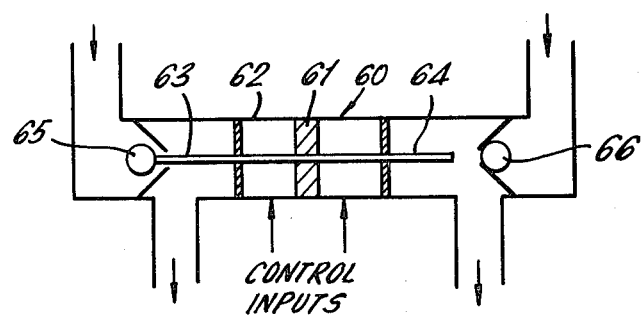
FIGS. 3 and 4 are diagrams illustrating further valve operating arrangements.

The use of the pressure intensifier in FIG. 2 avoids the necessity for having large piston areas operating the valves. However this problem may be avoided by making use of an arrangement such as is shown in FIG. 3 in which there is a low-pressure-operated actuator 60 comprising a piston 61 in a cylinder 62 with rods 63, 64 extending through seals in the chamber wall. These rods serve to open ball valves 65, 66 respectively, the ball valves normally being held against their seats by the fluid pressure to be controlled. It will be appreciated that two such control devices would be required, one for each cylinder.

Figure 4:
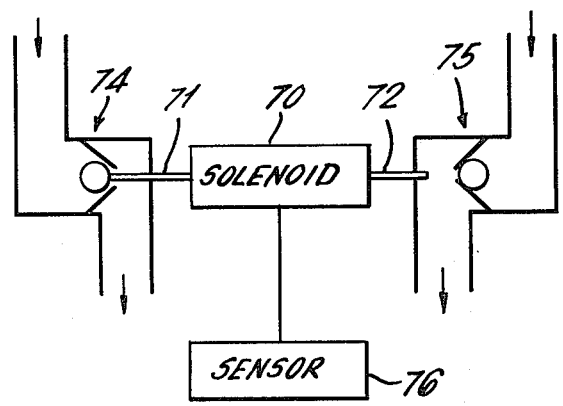

FIG. 4 illustrates another arrangement in which a solenoid 70 having operating rods 71, 72 actuates ball valves 74, 75 for controlling the connection of the rear face of one cylinder either to the module or to discharge as required. The solenoid is operated by a sensor 76 which might for example be an inductive sensor sensing the position of the piston. Separate induction coils may be provided at each end of the cylinder to provide sensing signals indicative of when the piston has reached the ends of the cylinder. It will be appreciated that it is merely necessary to sense when the piston is approximately at the end of the cylinder. The actual length of travel for each stroke is not critical. However the valves on the two cylinders will have to be operated simultaneously and thus one sensing system will be used to control the solenoid for operating the valves on both cylinders.

Figure 5:
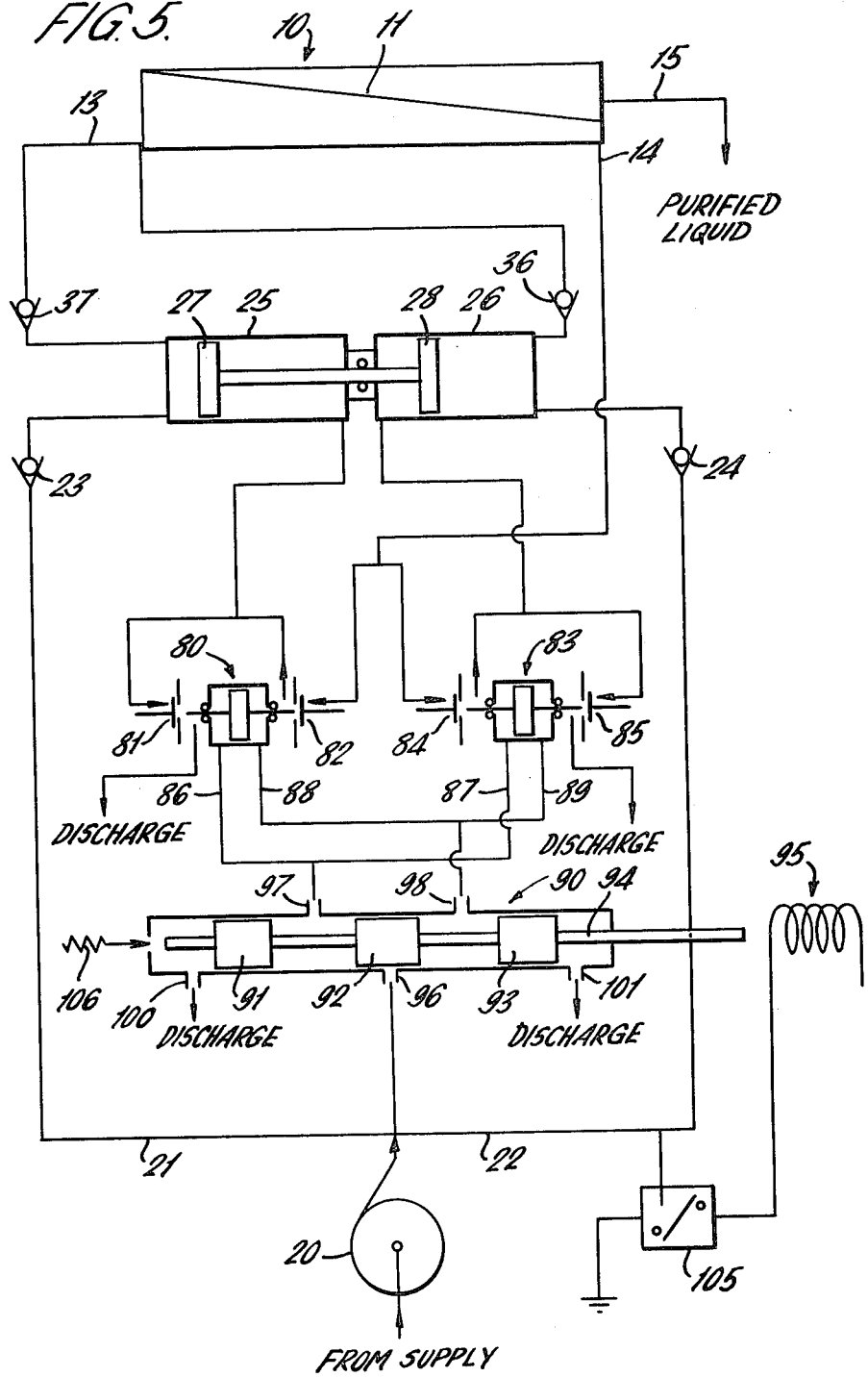

In FIG. 5 there is illustrated a construction in which the pressure rise at the end of the stroke is used not to operate directly valves controlling the ports for the main cylinder but to operate a spool valve controlling piloted valves for these ports.

In the following description, the same reference numerals will be used as in FIGS. 1 and 2 to illustrate corresponding components and mention will only be made of the distinctive features of the FIG. 5 construction.

A pilot piston and cylinder 80 controls valves 81 and 82 such that one of these valves is opened when the other one is closed and vice versa. The valve 81 connects the rear end of cylinder 25 to discharge whilst the valve 82 connects the rear end of that cylinder to the outlet 14 from the module. A second piloted valve comprises a piston and cylinder 83 operating valves 84, 85 such that one valve is open when the other is closed and vice versa. The valve 84 connects the rear end of cylinder 26 to the outlet 14 from the module 10 whilst the valve 85 connects the rear end of cylinder 26 to the discharge. The two piloted valves 80, 83 are operated in synchronism by applying pressure, as will be described later, to lines 86, 87 leading to one side of the pistons in these piloted valves and connecting the other sides via lines 88, 89 to discharge or, by applying the pressure to lines 88, 89 and connecting lines 86, 87 to discharge, forcing the piloted valves into their opposite position. This operation is achieved by means of a spool valve 90 having three spools 91, 92, 93 on a common connector rod 94 which forms the armature for a solenoid 95. Inlet pressure from the pump 20 is applied to an inlet port 96 and, according to the position of the spool valve, this pressure is applied either via an outlet port 97 to the aforementioned connectors 86, 87 or via an outlet port 98 to the aforementioned connector leads 88, 89. Outlets 100, 101 from the spool valve lead to the discharge and serve to connect the appropriate one of the ports 97, 98 to discharge when the other port is subjected to the pump pressure. The solenoid is operated by means of a timer or by means of a proximity sensor on the main pistons 27, 28 or by a pressure-operated switch 105, as indicated diagrammatically in FIG. 5, this switch responding to the increase in pressure at the outlet of the pump 20 at the end of the stroke serving to effect an electrical connection energising the solenoid to reverse the spool valve. The spool valve may be moved in one direction or the other electrically, e.g. by providing separate solenoids for each direction of movement or the movement in one direction may be effected by the solenoid and movement in the opposite direction by a spring indicated diagrammatically at 106.

Particularly with a large reverse osmosis installation having a plurality of cylinders 25, 26 which are to be operated in a timed sequence, it may be convenient to use a timing device for operating the associated spool valve for each double cylinder device. Such an arrangement may also be used in a radial system, as previously described, having three or more cylinders operated in sequence.

FIG. 6 illustrates another construction in which the rise in pressure of the water from the pump 20 at the end of the stroke is utilized to effect operation of a spool valve controlling the piloted valves. In FIG. 6, the spool valve 90 and the piloted valves 80, 83 are similar to those described with reference to FIG. 5 and the same reference characters are used to indicate corresponding components. In FIG. 6 however reversing of the spool valve 90 is effected by means of a reversing mechanism comprising a fixed cylinder 110 having a piston 111 which is urged in one direction by means of a spring 112. The piston is movable in the opposite direction under the influence of the pressure from the pump 20 via line 113. The spring 112 is arranged so that normally it holds the piston 111 at the right-hand end of the cylinder as seen in the drawing when the pump 20 is providing the normal output pressure which is, in this particular embodiment, 60 p.s.i. As previously explained, at the end of the stroke of the main pistons in the cylinders 25, 26, the output pressure from the pump 20 will rise. This output pressure is applied to the piston 111 and overcomes the spring force to drive the piston to the left.

The piston carries a flexible needle 120, which is typically a stainless steel wire, stiffened along part of its length remote from the piston 111, this stiffening being effected by a thin bore metal tube 121 surrounding the wire. The wire is terminated in a small ball or loop 123. The needle is thus flexible only in the region close to the piston 111. This needle co-operates with a cam 130 having cam surfaces in the form of a letter W, the surfaces being curved and having a central upstanding part 131 and outer upstanding parts 132, 133. The cam is pivoted on a fixed pivot 134 and is rotatable through 45° in either direction so that it is movable into either one or other of the positions shown in FIGS. 6a and 6b. FIG. 6 shows the cam in a neutral position. In normal operation it is, as explained below, forced into one or other of the positions shown in FIG. 6a or 6b. This cam has pivoted thereto at 138, a connecting rod 139 for effecting linear movement of the operating member 104 for the spool valve 90.

At the end of an operating stroke of the pistons in the main cylinders 25, 26, the pressure at the output of the pump 20 rises and drives the needle 120 forwardly. This will engage one side or other of the central projection 131 and will ride around the curved cam surface so as to push that end of the cam 130 to the left in the drawing. If this is the upper part of the cam, then the spool operating member is drawn to the right, the cam being set thus to the position shown in FIG. 6a. If on the other hand the needle engages the lower part of the cam, it will push the lower part of the cam to the left and will force the operating member of the spool to the left with the cam being set as shown in FIG. 6b.

It will be immediately apparent from FIGS. 6a and 6b that, as soon as the cam has been set on one side by an operating stroke of the needle, it is positioned so that the needle will select the opposite direction for the next stroke. Thus the system operates to reverse the spool valve 90 each time the pressure in the output of the pump 20 rises.

It will be noted that the alternate reversing thus achieved happens at the end of each stroke so that the pressure in the feed system 21, 22 will not fall until the controlled valves 80, 83 have changed their position and thus permitted the main pistons 27, 28 to reverse their function and commence movement in the opposite direction. At the end of the new stroke, the pistons 27, 28 will again stop, pressure will rise and overcome the spring force of spring 112 to operate the mechanism again to engage the new section of the cam 130 and rotate the cam back.

The spool valve 90 is preferably arranged so that the pressure port 96 of the spool does not admit pressure to the chambers on one or other side of the central spool 92 until the outer spools 91, 93 have covered or uncovered the ports 97, 98 leading to the piloted valves 80, 83. This ensures that O-rings or other seals on the spools are under zero pressure as they pass the ports in the walls of these chambers. Each port 97, 98 is arranged as a number of small apertures extending around the circumference of the body of the valve in each porting position. Thus very small holes can be used so minimizing the intrusion of such O-rings into these holes. The centre port 96 is under pressure from the pump 20 all the time and thus intrusion into the holes providing the centre port is impossible. The outermost ports leading to discharge are never under pressure and so need not be protected in this way.

I claim:

1. Apparatus for the reverse osmosis purification of water or other fluid comprising a fluid supply, a module including a reverse osmotic membrane, a fluid inlet and fluid outlet for the passage of fluid over one surface of the membrane and an outlet for the passage of purified fluid out of the module from the opposite surface of the membrane together with a plurality of similar cylinders each having a piston or diaphragm means dividing the cylinder into a front end and a rear end, the front end of each cylinder having a larger swept volume than the rear end, fluid connections connecting the front end of each cylinder to the fluid inlet of the module, a separate non-return valve in each fluid connection from the front end of each cylinder, each said cylinder having its piston or diaphragm means for forcing fluid at a pressure in excess of, at least, the normal osmotic pressure of water from the front face of the piston or diaphragm means through said separate valve to the fluid inlet of the module, operating rod means mechanically interconnecting said piston or diaphragm means, which operating rod means extend from the rear faces of said piston or diaphragm means, said piston or diaphragm means mechanically operating in a cyclic sequence, separate fluid connections have a separate non-return or controlled distribution valve for the front end of each cylinder means arranged for supplying fluid, under a relatively low pressure, compared with the normal osmotic pressure of water, from said fluid supply to the front end of each cylinder through said separate fluid connections with the separate non-return valve or controlled distribution valve therein, and controlled valve means being operative to connect the fluid outlet of the module to the rear ends of said cylinders in synchronism with said cyclic sequence so that all the fluid leaving said fluid outlet flows back to said cylinders into the rear ends thereof in cyclic sequence to drive the piston or diaphragm means towards the front ends, said controlled valve means furthermore being operative to connect said rear ends of each of the cylinders to a discharge in sequence when the respective piston or diaphragm means are moving back towards those ends.

2. The invention of claim 1, wherein said apparatus has two cylinders which are in end to end alignment and the piston or diaphragm means are interconnected by a common operating rod which constitutes the rod means.

3. The invention of claim 1, wherein said apparatus has three or more cylinders, each of said cylinders having an operating rod with said rods being interconnected by a free-running crankshaft and said rods constituting the rod means.

4. Apparatus for the reverse osmosis purification of water or other fluid comprising a fluid supply, a module including a reverse osmotic membrane, a fluid inlet and fluid outlet for the passage of fluid over one surface of the membrane and an outlet for the passage of purified fluid out of the module from the opposite surface of the membrane together with ram means comprising a pair of similar cylinders each having a piston or diaphragm having a front face and a rear face and dividing the cylinder into a front end and rear end, fluid connections connecting the front end of each cylinder to the fluid inlet of the module, a separate non-return valve operatively disposed in each connection, each cylinder with its piston or diaphragm being arranged for forcing fluid at a pressure in excess of, at least, the normal osmotic pressure of water, from the front face of the piston or diaphragm through said separate valve to the fluid inlet of the module, a common operating rod, the cylinders being axially aligned with said common operating rod extending from the rear face of one piston or diaphragm to the rear face of the other piston or diaphragm so that the front face of each piston or diaphragm has a larger area exposed to fluid than the rear face, pump means with two separate non-return valves, said pump means being operative to supply fluid, at a relatively low pressure, compared with the normal osmotic pressure, from said fluid supply through said separate non-return valves to the front end of each said cylinder and controlled valve means operative selectively to connect the fluid outlet from the module to the rear end of one cylinder and to connect the rear end of the other cylinder to a discharge or to connect the fluid outlet from the module to the rear end of said other cylinder and to connect the rear end of said one cylinder to said discharge and control means for said controlled valve means operative to change-over the connections when the pistons or diaphragms reach the end of a stroke.

5. Apparatus as claimed in claim 4 wherein said controlled valve means are controlled in response to the pressure rise in the supply fluid at the end of a stroke.

6. Apparatus as claimed in claim 4 wherein said controlled valve means are controlled by sensing means sensing the position of the pistons or diaphragms.

7. Apparatus as claimed in claim 6 wherein said sensing means provide an electric signal.

8. Apparatus as claimed in claim 4 and having hydraulic means including a spool valve arranged for operating said controlled valve means and wherein means responsive to the pressure rise in the output of said pump means at each end of each stroke of said pistons or diaphragms are arranged to effect operation of the spool valve to thereby operate said controlled valve means.

9. Apparatus as claimed in claim 8 wherein said controlled valve means comprise two separate hydraulic actuators, associated respectively with the two cylinders, each actuator having two valves, one of which is open and the other closed in one state of the actuator, the actuator being operative to close the open valve and open the closed valve.

* * * * *